M. F. H. GOUVERNEUR.
METHOD AND MEANS FOR FORMING PASSAGES IN PLASTIC MATERIAL.
APPLICATION FILED MAY 26, 1920.
1,413,023. Patented Apr. 18, 1922.
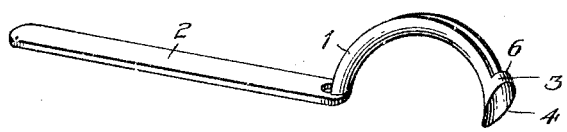
Fig. 1.
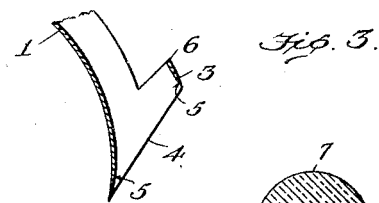
Fig. 2. Fig. 7. Fig. 3.
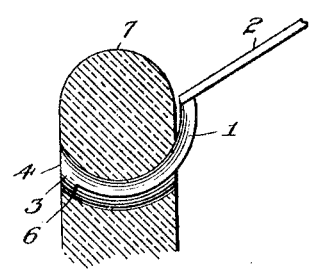
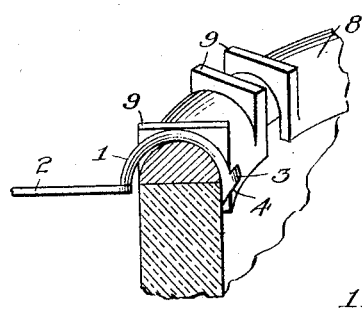
Fig. 5. Fig. 4.
Fig. 6.
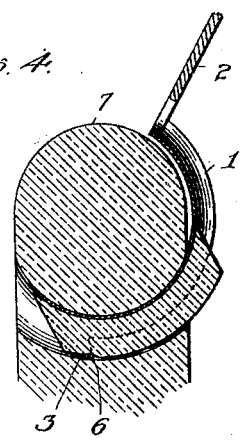
Witness
Edwin L. Bradford
Inventor
Minor F. H. Gouverneur
By Ernst A. Mechlin
his Attorney

UNITED STATES PATENT OFFICE.

MINOR F. H. GOUVERNEUR, OF ROCHESTER, NEW YORK, ASSIGNOR, BY MESNE ASSIGNMENTS, TO LOCKE INSULATOR CORPORATION, OF BALTIMORE, MARYLAND, A CORPORATION OF MARYLAND.

METHOD AND MEANS FOR FORMING PASSAGES IN PLASTIC MATERIAL.

1,413,023.  Specification of Letters Patent.  Patented Apr. 18, 1922.

Application filed May 26, 1920. Serial No. 384,388.

*To all whom it may concern:*

Be it known that I, MINOR F. H. GOUVERNEUR, a citizen of the United States, residing at Rochester, in the county of Monroe and State of New York, have invented certain new and useful Improvements in Methods and Means for Forming Passages in Plastic Material; and I do hereby declare the following to be a full, clear, and exact description of the invention, such as will enable others skilled in the art to which it appertains to make and use the same.

My invention relates to a method and means for forming passages or perforations in porcelain or other material which is similarly worked, shaped or manipulated while in a plastic state prior to being hardened by firing, drying or baking. The invention is especially adapted for the production of passages or perforations in electric insulators where it is desired to make the passage turn through an angle in the course of its length.

While attempts have been made by the casting process to form porcelain insulators with holes or passages to receive bolts, cables and the like for attaching metal parts to the porcelain, the results attained have not been sufficiently satisfactory to lead to the commercial adoption of this process, and open ended passages in porcelain insulating bodies are, so far as I am aware, now universally made by drilling the material after it has been hardened by firing. By my method the passage is formed in the plastic material before it is fired by cutting therefrom a core the shape of the passage, the core being subject to no substantial displacement with respect to the body of plastic material while it is being cut and being removed after having been completely formed. In this way the passage is produced with a minimum disturbance of the plastic porcelain, the result being that the walls of the passage are smooth and upon firing do not develop cracks weakening the insulator both physically and in respect to its electrical resistance.

In practicing my method I prefer to employ a hollow cutter formed as a thin narrow ring-like blade or band, and I have illustrated such a cutter as constituting part of a tool suitable for practicing the invention; but it is to be understood that the special design of tool shown and described is merely illustrative of an appliance suitable for use in performing the method.

In the drawings which illustrate two slightly different forms of tools and the manner of their use to cut arcuate passages through plastic bodies,—

Figure 1 is a perspective view of a tool for cutting a curvilinear passage from one side to the opposite side of a wall of plastic material.

Fig. 2 shows such a tool as applied to the plastic material ready to be actuated to cut the passage therein, the form of the passage being indicated by dotted lines.

Fig. 3 is a view corresponding to Fig. 2 but illustrating the position of the tool at the end of its cutting operation.

Fig. 4 is an enlarged detail view showing the tool in section and illustrating the manner of withdrawing the core from the passage which has been cut.

Fig. 5 is a detail perspective view illustrating the use of the tool shown in Fig. 1 in conjunction with a template applied to the plastic body for guiding the tool during its cutting operation.

Fig. 6 is a view of a modified tool especially suitable for cutting a circular passage beneath a projection on the body of plastic material, the course of the passage being indicated by dotted lines.

Fig. 7 is a detail sectional view of the cutting end of the tool illustrated in Figs. 1 to 5, inclusive.

The cutting tool which is illustrated in Figs. 1 to 5, inclusive, is designed to form a passage of circular cross section through a wall of plastic material having parallel faces. It involves an arcuate circularly curved stem 1 to one end of which is rigidly attached an operating handle 2. The handle 2 is preferably substantially radial to the curved stem 1 as such an arrangement facilitates the manipulation of the tool in causing its cutter to follow a circular path; and such a disposition of the handle is also advantageous in case, as illustrated in Fig. 6, the passage to be cut enters and leaves surfaces which are in the same plane. The end of the stem 1 opposite the handle bears a hollow cutter 3 having a closed periphery, said cutter being formed as a thin narrow blade having a cutting edge 4 extending completely around its circumference. The curvilinear stem 1 is of channel form, its inner and outer faces being parallel and corresponding to the contour of the walls of the channel to be cut, and the corresponding surfaces of the cutter 3 respectively merge into and form continuations of the adjacent surfaces of the stem to which the cutter is attached at one side only.

Where the passage is to be cut through a wall having parallel faces, as shown in Figs. 2, 3, 4 and 5, the leading or cutting edge 4 of the cutter is arranged in a plane which is offset from or passes to one side of the center of curvature of the stem 1 so that (see Fig. 3) the entire cutting edge 4 will coincidently merge from the plastic material at the end of the cutting operation. This prevents rupturing or tearing of the walls of the passage.

The cutting edge 4 is formed by beveling the hollow cutter 3 on the inside as indicated at 5 in Fig. 7, thus making the diameter of the passage equal to the exterior diameter of the cutter and thereby permitting the cutter and stem 1 readily to move through the plastic mass as the cutting proceeds without binding upon the plastic material forming the walls of the passage. The opening through the hollow cutter 3 is somewhat constricted back of its cutting edge by inclining the portion 6 of the blade inwardly to a slight extent. Since the core cut from the plastic material by the tool is compressed as the cutter moves forward and as it subsequently expands somewhat back of the hollow cutter as the cutter advances, this constriction of the opening through the cutter causes the portion 6 of the latter to bite into the core (see Fig. 4) when the tool is manipulated to withdraw the cutter from the passage, the core thereby being extracted by the tool after being completely cut.

As shown in Figs. 2, 3, 4 and 6, the plastic material itself may be provided with a face or surface 7 in the nature of a template assisting in guiding the movement of the tool; but, as shown in Fig. 5, if the surface of the plastic body through which the passage is to be formed does not lend itself to such purpose, a template 8 of the desired character may be employed. The template shown in Fig. 5 is one which may be used in forming radially disposed curvilinear passages through a hollow cylinder, pairs of flanges 9 which receive the tool between them regulating the spacing of the passages.

The tool illustrated in Fig. 6 is identical with that heretofore described except that the leading or cutting edge 10 of the hollow cutter 11 is in a plane which is approximately radial to the curved stem 1. This form of tool is also provided with a substantially radially extending handle 2.

The manner of cutting and withdrawing the core from the plastic body by the use of the cutting tool which has been described will be readily understood upon reference to Figs. 2, 3 and 4 of the drawings, Fig. 2 illustrating the tool ready to begin the cutting, Fig. 3 illustrating its position at the end of the cutting operation, and Fig. 4 showing the operation of withdrawing the core from the plastic body.

I claim:—

1. The method of producing a curvilinear passage in an article formed from plastic material and subsequently hardened, which consists in cutting a core the shape of the passage from the material while in the plastic state without substantially displacing said core with respect to the body of plastic material, and subsequently removing said core prior to said hardening of the plastic material.

2. The method of forming in plastic material a passage whose direction changes between its ends, which involves linearly moving without peripheral rotation a hollow peripherally closed cutter through the plastic material and simultaneously causing the leading edge of said cutter to be presented at successively different angles to the plastic material to be cut and subsequently removing the material cut by the cutter.

3. The method of forming in plastic material a passage whose direction changes between its ends, which involves curvilinearly moving without peripheral rotation a hollow cutter through the plastic material to cut a core therefrom, retracting the cutter on the core for a portion of the length of the core, and thereafter simultaneously withdrawing said cutter and core from the plastic material.

4. The method of forming in porcelain a passage whose direction changes between its ends, which involves curvilinearly moving without peripheral rotation a hollow ring-like cutter through the porcelain in a plastic state to cut a core therefrom, withdrawing the cutter and core from the plastic material, and subsequently firing the material with the passage formed therein.

5. A cutting tool provided at one end with a hollow cutter having a closed periphery and provided at the other end with a handle and having an intermediate arcuate portion connecting said cutter and handle and offset from said handle.

6. A cutting tool having a curvilinear stem and provided at one end of said stem with a hollow cutter having a closed periphery.

7. A cutting tool provided with a hollow cutter having a closed periphery, a handle, and an intermediate arcuate portion connecting said cutter and handle, said handle adjacent said intermediate arcuate portion being substantially radial to said arcuate portion.

8. A cutting tool having a curvilinear stem of channel form and provided at one end of said stem with a hollow cutter having a closed periphery.

9. A cutting tool having a curvilinear stem of channel form and provided at one end of said stem with a hollow cutter having a closed periphery, the exterior and interior surfaces of said cutter respectively merging into correspondingly formed surfaces of said curvilinear stem.

10. A cutting tool having a curvilinear stem and provided at one end of said stem with a hollow cutter having a closed periphery, the opening through said cutter being constricted back of its cutting edge.

11. A cutting tool having a curved stem provided at one end with a hollow cutter having a closed periphery, said cutter being beveled on the interior to form the cutting edge.

12. A cutting tool having a uniformly curved stem and provided at one end of said stem with a hollow cutter having a closed periphery, the opening through said cutter being constricted back of its cutting edge and said stem being connected to said cutter at one side only.

13. A cutting tool having a stem formed as a circular arc and provided at one end of said stem with a hollow cutter having a closed periphery, the cutting edge of said cutter being in a plane offset from the center of curvature of said stem.

14. A cutting tool provided with a hollow cutter having a cutting edge coextensive with its circumference and provided with a stem whose inner surface is struck from the same radius as the said cutting edge rigidly secured to said cutter, a portion of said cutter being offset from said stem.

15. A cutting tool for perforating a plastic mass, said tool comprising a hollow cutter formed of a narrow blade having a cutting edge extending entirely around its circumference, and a curved stem eccentrically disposed with respect to said cutter for forcing said blade into and through the plastic mass in a curvilinear direction.

In testimony whereof I affix my signature.

MINOR F. H. GOUVERNEUR.